June 4, 1929.   L. F. MOODY   1,716,078
HYDRAULIC TURBINE
Original Filed June 25, 1920
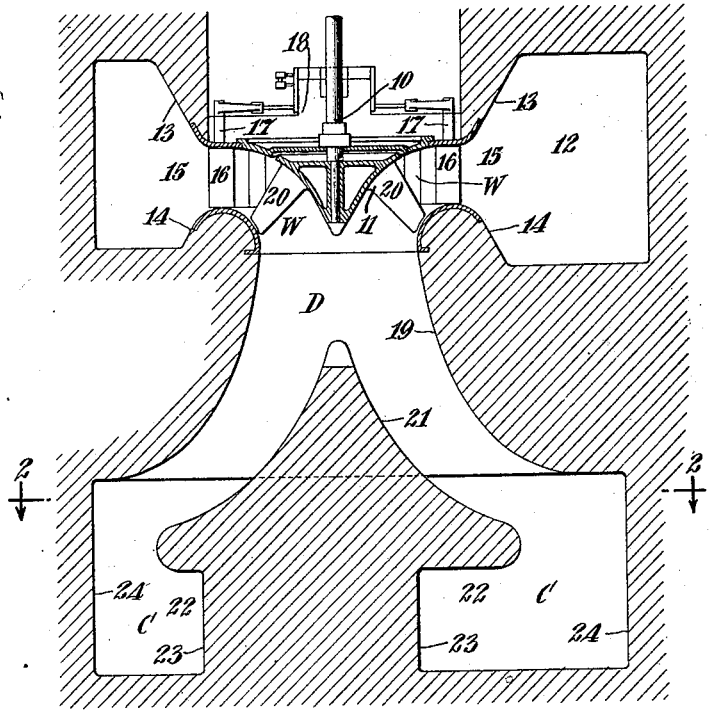
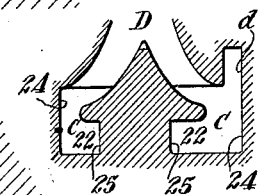
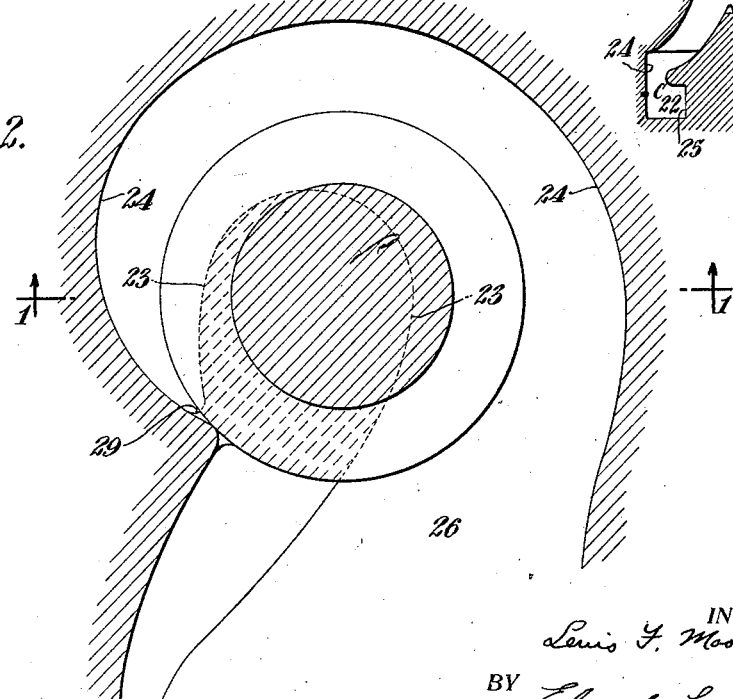
INVENTOR
Lewis F. Moody
BY Edwards, Sager & Bower
his ATTORNEYS Patented June 4, 1929.

1,716,078

UNITED STATES PATENT OFFICE.

LEWIS FERRY MOODY, OF PHILADELPHIA, PENNSYLVANIA.

HYDRAULIC TURBINE.

Original application filed June 25, 1920, Serial No. 391,583. Divided and this application filed March 29, 1926. Serial No. 98,083.

This invention relates to hydraulic turbines, and particularly to turbines of high specific speed through which large quantities of water flow at high velocity head compared to the net head on the plant, and to turbines having wicket gate or movable guide vane means for regulating the flow.

The object of the invention is to provide a turbine installation in which large quantities of water can be handled within a limited space, and within which the water can be set into motion at high velocity and again retarded to a low velocity at discharge with minimum loss of head, and may impart to the turbine runner a high velocity of rotation; and it is at the same time an object of the invention to provide such a turbine with an operating mechanism for controlling the power and speed, so arranged that the working parts are readily accessible outside of the water passages while the turbine is in operation.

Another object of the invention is to provide a turbine in which the intake and outflow passages and the control means are adapted to produce a whirling body of water within which the runner rotates at high speed, and to decelerate the velocity of whirl in a draft tube spreading outward away from the turbine axis on all sides, so as efficiently to regain the kinetic energy of the water leaving the runner.

The turbine to which the specific features of this invention are particularly adapted is one having a propeller type runner, that is, an unshrouded axial flow runner having a small number of vanes. In order to enable such a runner to operate at high velocity the draft tube of the turbine of this invention expands radially at its discharge end to a diameter considerably greater than that of the runner, so that the water may leave the runner with a considerable velocity of whirl, this whirl being efficiently decelerated and the water leaving the discharge end of the draft tube at low velocity.

Further objects of the invention particularly in the arrangement of the turbine units and passages in the power house will appear from the following description taken in connection with the accompanying drawings in which:

Fig. 1 is a vertical sectional view of a turbine installation taken on line 1—1 of Fig. 2 showing one embodiment of the invention;

Fig. 2 is a horizontal sectional view on line 2—2 of Fig. 1; and

Fig. 3 is a vertical sectional view illustrating a modified form of a draft tube.

In the embodiment of the invention illustrated a turbine with a vertical shaft 10 has a runner 11 in a water passage W. The intake passage 12 leading to this water passage is a contracting volute having inner walls 13 and 14 substantially circular and converging to the entrance space 15 of the passage W. In this entrance space 15 are the adjustable guide vanes or wicket gates 16 controlled through their stems 17 by the operating means 18 around shaft 10.

The flow enters in through the intake passage 12 with a whirl and passes through adjustable guide vanes 16 in a radial direction and with a whirl and is turned downward toward the axial direction in the water passage W. In an intermediate position in this water passage W the blades 20 of the runner 11 are interposed, extending diagonally across the flow and being of the diagonal inward flow type. This runner rotates at high speed under light torque and the discharge from it has a considerable velocity of whirl the energy of which would be largely lost in the ordinary straight draft tubes adapted to regain only the axial components of the discharge.

This invention is not restricted to any particular angles of the runner blades, but is applicable even when the blades are normal to the axis and the runner is of the axial flow type.

The draft tube D from water passage W spreads or expands radially in the direction of flow so as to permit the whirling discharge to be decelerated on expanding spiral lines and at the same time the area of the draft tube across the meridian components of flow gradually increases. This provides for a natural gradual deceleration of both the axial and the whirl components of flow so as to regain the energy of both by reconverting it into effective pressure head. It should be understood that as the water recedes from the axis, since its moment of momentum will remain the same its velocity of whirl will vary inversely as the distance from the axis. The spreading draft tube D thus lowers the velocity of the discharge and delivers it to the outflow passage C of volute form expanding in the direction outflow to continue the conversion of velocity into pressure head. The deceleration of the discharge requires constantly widening passages and to provide an outflow passage of large cross section without exceeding the allowable over-all dimensions, as determined for instance by the intake passage 12, the outflow volute C is extended to an undercut 22 below the central conoidal surfaces 21 of the draft tube D; the inner wall 23 of this undercut and the outer wall 24 of the collection chamber forming a volute outlet beginning at the point 29 and curving around and expanding into the outlet 26.

The draft tube just described conforms to the following principle:—It first diverts the water from the turbine axis in order to increase the radius of the paths of the whirling flow, in a space contained between two surfaces of revolution in which the whirling flow can freely proceed. At the point of greatest radius (the magnitude of this radius being limited by the space restrictions of the power house) the form of passage ceases to be a space contained between surfaces of revolution, and from this point onward the walls become spirals instead of circles about the axis, when viewed in planes perpendicular to the axis. If in undercutting the central conical wall, to gain the required conduit area, the walls of the passage were continued as surfaces of revolution approaching the axis once more, the law of "conservation of moment of momentum" above referred to would cause the velocity of whirl again to increase, this velocity varying inversely as the radius as already explained. By forming the conduit walls as spirals, however, from the point of greatest radius onward, the velocity is controlled at every point and made equal to the quantity flowing at each point divided by the transverse area of the channel, which can be so gradually increased that the velocity will gradually and continuously decrease up to the point of final discharge into the tail race.

If still greater cross sectional area is desired for the outflow passages the volute C may be extended upward as indicated at $d$ in Fig. 3 and still be kept within the permissible over-all dimensions. The turbine installation above described provides entrance and discharge water passages of large area with correspondingly low velocities and reduced friction losses and these passages at the same time cooperate with the water passage W to deliver the water to the runner and receive it therefrom at high velocity and with high velocity of whirl. Such a combination is particularly adapted for use with a high speed runner requiring high velocities of flow at the runner blades and extracting only a relatively small torque from the flow. The relatively large quantities of water utilized make it highly desirable to have both the conversion of pressure head into velocity head and the re-conversion of velocity head into pressure head as efficient as possible. This is accomplished by the above described installation which at the same time provides for keeping the water passages within a compact space having relatively small over-all dimensions.

The application is a division of the copending application of L. F. Moody, Serial No. 391,583, filed June 25, 1920, for hydraulic turbine, now Patent No. 1,656,889, issued January 17, 1928.

I claim:

1. In a hydraulic turbine the combination with an entrance space having an inwardly directed flow, of means for imparting a whirl to said flow, a curving transition space receiving the flow from said entrance space and turning it toward the axial direction, a runner in said flow, a continuously curving draft tube receiving the flow from said runner and turning it gradually toward the radially outward direction in diverging spiral flow lines, a discharge passage receiving the outflow from said draft tube and inwardly undercut under the spreading end of said draft tube.

2. In a hydraulic turbine the combination with an entrance space having an inwardly directed flow, of means for imparting a whirl to said flow, a curving transition space receiving the flow from said entrance space and turning it toward the axial direction, a runner in said flow, a continuously curving draft tube receiving the flow from said runner and turning it gradually toward the radially outward direction in diverging spiral flow lines, a volute discharge passage receiving the outflow from said draft tube and inwardly undercut under the spreading end of said draft tube.

3. In a hydraulic turbine the combination with an entrance space having an inwardly directed flow, of means for imparting a whirl to said flow, a curving transition space receiving the flow from said entrance space and turning it toward the axial direction, a runner in said flow, a continuously curving draft tube receiving the flow from said runner and turning it gradually toward the radially outward direction in diverging spiral flow lines, a discharge passage receiving the outflow from said draft tube inwardly undercut at its inner wall under the spreading end and uppercut above the outer wall of said draft tube.

4. In a hydraulic turbine the combination with an entrance space having an inwardly directed flow, of means for imparting a whirl to said flow, a curving transition space receiving the flow from said entrance space and turning it toward the axial direction, a runner in said flow, a continuously curving draft tube receiving the flow from said runner and turning it gradually toward the radially outward direction in diverging spiral flow lines, a volute discharge passage receiving the outflow from said draft tube inwardly undercut at its inner wall under the spreading end and uppercut above the outer wall of said draft tube.

5. In a hydraulic turbine the combination with an intake adapted to direct the flow radially inward and impart a whirl to it, of means for varying said whirl, a draft tube through which the flow passes outward with a radial component away from the axis of said whirl, a conduit continuously curving in the same direction and leading from said intake to said draft tube, a turbine runner in said conduit, a volute discharge passage receiving the outflow from said draft tube and inwardly and spirally undercut under the spreading end of said draft tube.

6. In a hydraulic turbine the combination with an intake directed toward the turbine axis and adapted to impart a whirl to the flow, of adjustable guide vanes for varying said whirl, an outwardly directed outlet adapted to discharge a whirling flow with a radial component away from the turbine axis, a conduit leading from said intake to said outlet continuously curving without sudden change in curvature, a turbine runner in said conduit, and a volute discharge passage receiving the outflow from said outlet and inwardly undercut under the spreading end of said outlet.

7. In a hydraulic turbine the combination with an intake adapted to direct the water radially inward and impart a whirl to the flow, of adjustable guide vanes for varying said whirl, an outlet through which the flow passes outward with a whirl, a conduit curving in the same direction and leading from said intake to said outlet, a turbine runner in said conduit and spaced from said intake so as to leave a curving transition space between said intake and said runner, and a discharge passage receiving the outflow from said outlet and inwardly undercut under the spreading end of said outlet.

8. In a hydraulic turbine the combination with an intake adapted to direct flow radially inward and impart a whirl to it, of means for varying said whirl, a draft tube through which the flow passes outward with a radial component away from the axis of said whirl, a conduit continuously curving in the same direction and leading from said intake to said draft tube, a turbine runner in said conduit, a discharge passage receiving the outflow from said draft tube inwardly undercut under the spreading end and uppercut above the outer wall of said draft tube.

9. In a hydraulic turbine the combination with an intake directed toward the turbine axis and adapted to impart a whirl to the flow, of adjustable guide vanes for varying said whirl, an outwardly directed outlet adapted to discharge a whirling flow with a radial component away from the axis, a conduit leading from said intake to said outlet continuously curving without sudden change in curvature, a turbine runner in said conduit, and a discharge passage receiving the outflow from said outlet and inwardly undercut under the spreading end and uppercut above the outer wall of said outlet.

10. In a hydraulic turbine the combination with an intake adapted to direct the water radially inward and impart a whirl to the flow, of adjustable guide vanes for varying said whirl, an outlet through which the flow passes outward with a whirl, a conduit curving in the same direction and leading from said intake to said outlet, a turbine runner in said conduit and spaced from said intake so as to leave a curving transition space between said intake and said runner, and a discharge passage receiving the outflow from said outlet and inwardly undercut under the spreading end and uppercut above the outer wall of said outlet.

11. In a hydraulic turbine the combination with a runner, of a draft tube receiving the flow from the runner in a generally axial direction and discharging said flow outwardly away from the turbine axis on all sides, and a volute discharge passage receiving the flow from said draft tube and having a floor below the lower surface of said draft tube.

12. In a hydraulic turbine the combination with a runner, of a draft tube receiving the flow from the runner in a generally axial direction and discharging said flow outwardly away from the turbine axis on all sides, and a discharge passage receiving the flow from said draft tube and having a floor below the lower surface of said tube and an upper surface uppercut above the outer wall of said draft tube.

13. In a hydraulic turbine the combination with a draft tube, of a discharge passage receiving the flow from said draft tube having gradually increasing cross sectional areas adapted for gradual deceleration of the flow, and a floor below the lower surface of said draft tube.

14. In a hydraulic turbine the combination with a draft tube, of a discharge passage receiving the flow from said draft tube having gradually increasing cross sectional areas adapted for gradual deceleration of the flow, and a floor below the lower surface and a roof above the wall of said draft tube.

15. In a hydraulic turbine the combination with a spreading draft tube having a relatively long gradually flaring passage leading from the turbine and a central core extending into said passage for turning the flow outward from its axis, of a collector passage receiving the flow from the draft tube, a portion of said collector passage having a roof disposed at a point intermediate of the top and bottom surfaces of the collector passage.

16. In a hydraulic turbine the combination with a spreading draft tube having a gradually flaring wall of substantial length, of a central core receiving the flow from the turbine runner in a generally axial direction and discharging said flow outwardly away from the turbine axis on all sides and a discharge passage receiving the flow from said draft tube at a point intermediate its top and bottom surfaces and a substantial distance from said bottom surface.

17. In a hydraulic turbine, the combination with a draft tube, of a collector passage receiving the discharge of fluid therefrom and having inner and outer cooperating spiral walls.

18. In a hydraulic turbine, the combination with a draft tube, of a collector passage having inner and outer cooperating spiral walls, said collector passage having portions of its roof at different elevations.

19. In a hydraulic turbine, the combination with a draft tube having a central core, of a collector passage having inner and outer cooperating spiral walls, the spiral of which begins at a point adjacent to the base of said central core.

20. In a hydraulic turbine, the combination with a draft tube having a central core, of a collector passage having inner and outer cooperating spiral walls terminating in a downstream direction, the spiral of which begins at a point adjacent to the base of said central core and at a point laterally disposed with respect to the central longitudinal axis of the downstream portion of the collector passage.

LEWIS FERRY MOODY.